United States Patent [19]

Cummins et al.

[11] 4,117,185

[45] Sep. 26, 1978

[54] BONDED INORGANIC AND FIBROUS MATERIAL BUILDING PRODUCT

[75] Inventors: Peter Gerald Cummins, Hastings; Bernard Sinton, Horsham; Michael George Miller, Cranleigh, all of England

[73] Assignee: Redland Claddings Limited, England

[21] Appl. No.: 739,001

[22] Filed: Nov. 4, 1976

[30] Foreign Application Priority Data

Jun. 3, 1976 [GB] United Kingdom ............... 23009/76

[51] Int. Cl.² .......................... B32B 5/16; B32B 17/04
[52] U.S. Cl. .................................... 428/241; 428/246; 428/421; 428/422; 428/454; 428/448; 428/543; 428/538; 156/62.2; 156/242; 264/113; 264/115; 425/112
[58] Field of Search ............... 428/241, 246, 421, 422, 428/543, 538, 454, 448; 156/62.2, 242; 264/115, 113; 425/112

[56] References Cited

U.S. PATENT DOCUMENTS

| 2,851,730 | 9/1958 | Wilhelm et al. | 264/113 |
| 3,197,356 | 7/1965 | Campbell | 428/241 |
| 3,228,823 | 1/1966 | Usala et al. | 428/421 X |
| 3,490,969 | 1/1970 | Schiff | 156/62.2 |
| 3,746,610 | 7/1973 | Hoegger | 156/62.2 |
| 3,850,674 | 11/1974 | Clarke, Jr. et al. | 428/421 X |
| 3,853,442 | 12/1974 | Stemp | 425/112 |

*Primary Examiner*—P. C. Ives
*Attorney, Agent, or Firm*—Young & Thompson

[57] ABSTRACT

A building product comprises a mineral filler and glass fiber bonded together by a polyester resin. A film or layer of a weather resistant fluoroplastic material is attached to a face of the building product by pressing the film or layer into contact with the face during curing of the resin in a mold. A method of manufacturing a building product as above is also described.

6 Claims, No Drawings

BONDED INORGANIC AND FIBROUS MATERIAL BUILDING PRODUCT

BACKGROUND OF THE INVENTION

The invention relates to building products and more particularly to building products of the kind comprising an inorganic material and a fibrous material bonded together by a resin.

One of the problems with such materials is that they may be subject to attack by the weather and as a result may suffer loss of some of their properties such as color, surface finish, etc.

SUMMARY OF THE INVENTION

It is an object of the invention to avoid or reduce this loss of property.

Accordingly the invention provides a building product of the kind described having on one face a film or layer of a weather resistant fluoroplastic material which film or layer has been attached to the product by pressing the film or layer into contact with the product during the curing of the resin.

Preferably the fluoroplastic material is polyvinylidenefluoride or polyvinylfluoride or a fluorohalocarbon.

The plastic material may be one that has one side treated for adherability and the other side treated to be readily releasable from a mold.

Preferably the product contains as a homogeneous mixture by weight from 12% to 30% polyester resin, from 2% to 15% glass fiber and from 62% to 86% of a finely divided mineral filler.

The invention further provides a method of manufacturing a building product which comprises pressing a film or a sheet of a weather resistant fluoroplastic material onto a face of a building material of the kind described during curing of the resin in a mold.

DESCRIPTION OF THE PREFERRED EMBODIMENTS

The material is basically manufactured according to our earlier United States patent specifications Nos. 3,670,063 and 3,853,442 the disclosure of which is hereby referred to. Hence the material is constituted by a mineral filler, a polyester resin and glass fibers. By making use of the present invention the ranges of the three constituents may be as follows:

Finely divided mineral filler 62% to 82% by weight.
Resin 12% to 32% by weight.
Glass fibers 2% to 15% by weight.

A film of fluoroplastic material is then attached to the building material. The film may be of polyvinylfluoride, polyvinylidenefluoride, or of one of the flurohalocarbons FEP, ETFE and E-CTPE but is preferably the polyvinylfluoride sold by Dupont under the Trade Name TEDLAR. The film is provided with one side treated for adherability and the other side heat sealable or releasable.

The film can be attached in either of two ways.

A sheet of the film can be introduced into the mold in which the uncured material manufactured according to patent No. 3,853,442 is to be introduced. The curing then takes place using heat and pressure and during this time the film, which has its adhesive side towards the material, adheres to the material.

Alternatively the film may replace one or both of the films on the feed rolls 13 and 18 shown in FIG. 5 of patent No. 3,853,442. The film is thus rolled together with the material and then the film and the material are cured together in a mold as before.

It has been found that the building material coated with the film has increased weather resistance.

We claim:

1. A method of manufacturing a building product comprising the steps of mixing together a mineral filler, glass fiber and a polyester resin into a mixture, forming said mixture into an uncured formed solid mass and applying a film of fluoroplastic material having one side treated for adhereability and the other side heat sealable or releasable, to at least one face of the unsecured solid mass with said one side in contact with said face, and pressing said film into contact with said face during heat curing of the resin in a mold.

2. A building product manufactured by the method of claim 1.

3. A method as claimed in claim 1 in which the film is applied to the said face in a mold and is pressed to the said face during heat curing in the mold.

4. A method as claimed in claim 1 in which the fluoroplastic material is selected from the group consisting of polyvinylidenefluoride, polyvinylfluoride and fluorohalocarbons.

5. A method as claimed in claim 1 in which said mixture contains by weight from 12% to 32% polyester resin, from 3% to 15% glass fiber and from 62% to 82% finely divided mineral filler.

6. A method as claimed in claim 4 in which the fluoroplastic material is polyvinylfluoride.

* * * * *